J. N. MICHELS & E. S. THORNGREN.
SWIVEL IMPLEMENT HANDLE.
APPLICATION FILED AUG. 2, 1912.
1,054,591.
Patented Feb. 25, 1913.
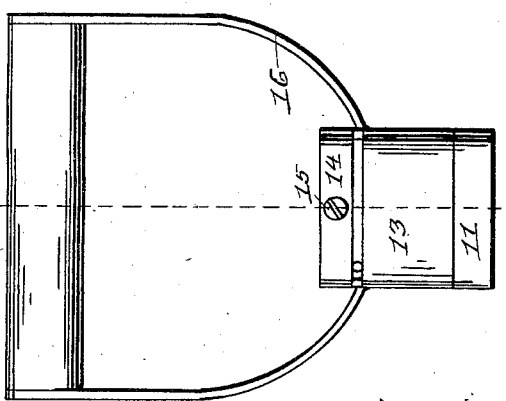
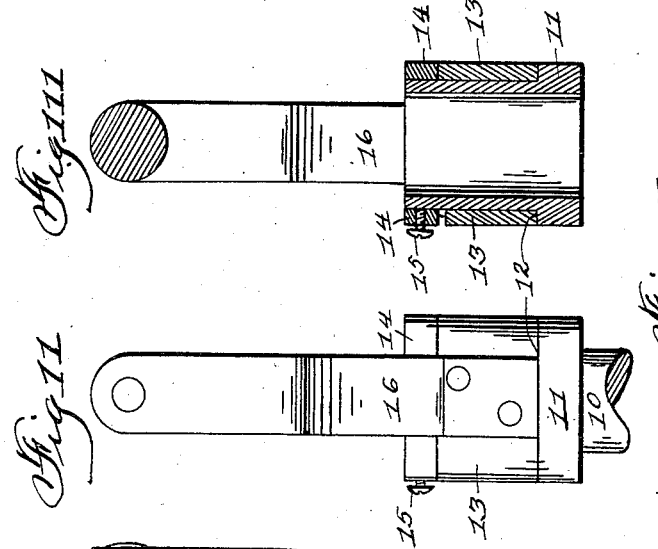
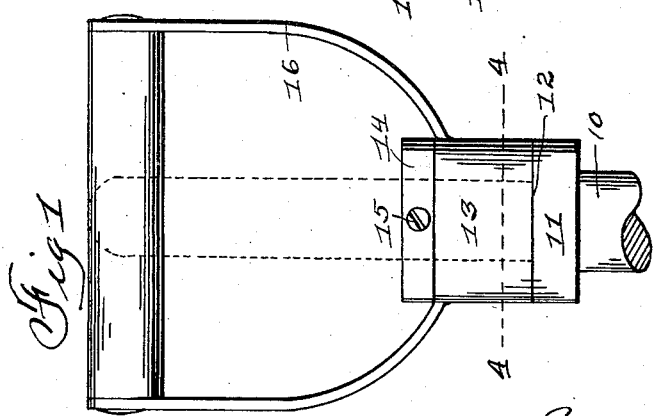

UNITED STATES PATENT OFFICE.

JOSEPH N. MICHELS AND ELMER S. THORNGREN, OF BOXHOLM, IOWA.

SWIVEL IMPLEMENT-HANDLE.

1,054,591.  Specification of Letters Patent.  Patented Feb. 25, 1913.

Application filed August 2, 1912. Serial No. 712,984.

*To all whom it may concern:*

Be it known that we, JOSEPH N. MICHELS and ELMER S. THORNGREN, citizens of the United States, residing in Boxholm, county of Boone, and State of Iowa, have invented a new and useful Improvement in Swivel Implement-Handles, of which the following is a specification.

The object of our invention is to provide a swivel handle for implements which will be simple, strong, durable and inexpensive in construction.

Our invention consists of certain details of construction hereinafter set forth, pointed out in our claims, and illustrated in the accompanying drawings, in which—

Figure I shows a side elevation view of our device. Fig. II shows an end elevation view of the same; Fig. III shows a longitudinal sectional view of the same; Fig. IV shows a transverse sectional view taken on the line 4—4 in Fig. I; and Fig. V shows a modified form which we sometimes employ.

Referring to the accompanying drawings the reference numeral 10 is used to indicate the shaft of an implement. Mounted on the upper extremity of said shaft is a ferrule 11 provided with a shoulder 12 and above said shoulder, and surrounding said ferrule is a second ferrule 13 the two being so fitted together that the outer ferrule will easily move upon the inner ferrule which is stationary on the shaft.

The numeral 14 indicates a ring surrounding the upper part of the ferrule 11 (above the ferrule 13) and is held in position thereon by means of a set screw 15. This ring is designed to retain the outer ferrule 13 in position. The handle 16 is attached to the outer ferrule 13, in the manner shown.

In the modified form, shown in Fig. V, we provide means, clearly shown, to limit the movement of rotation of the handle.

The advantage of a rotating handle on implements, is obvious, as it furnishes great convenience and facilitates the work.

Having thus described our invention what we claim and desire to secure by Letters Patent of the United States, is:

1. A swivel handle for implements comprising a ferrule stationary at the outer end of the implement shaft; a second ferrule mounted for rotary movement, on the aforesaid ferrule; a ring, provided with set screw securing means, mounted above the outer ferrule and secured to the inner ferrule; a handle secured to the outer ferrule, substantially as shown and described.

2. A swivel handle for implements, comprising a ferrule stationary on the implement shaft; a ferrule mounted for rotary movement on the aforesaid ferrule; means to retain the outer ferrule on the inner ferrule; a handle secured to the outer ferrule, means to limit the rotation of the outer ferrule, substantially as shown and described.

JOSEPH N. MICHELS.
ELMER S. THORNGREN.

Witnesses:
O. F. STARK,
ERNEST SODENQVIST.

Copies of this patent may be obtained for five cents each, by addressing the "Commissioner of Patents, Washington, D. C."